United States Patent
Bantz et al.

(10) Patent No.: US 7,493,654 B2
(45) Date of Patent: Feb. 17, 2009

(54) VIRTUALIZED PROTECTIVE COMMUNICATIONS SYSTEM

(75) Inventors: David F. Bantz, Portland, ME (US); Thomas E. Chefalas, Somers, NY (US); Steven J. Mastrianni, Unionville, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 10/993,771

(22) Filed: Nov. 20, 2004

(65) Prior Publication Data

US 2006/0112342 A1    May 25, 2006

(51) Int. Cl.
*G06F 15/16* (2006.01)
(52) U.S. Cl. .............................. 726/4; 726/15; 726/22; 726/23; 726/24; 726/25; 713/187; 713/188; 713/189

(58) Field of Classification Search .................... 726/4, 726/22–25, 15; 713/188, 187; 709/223–225; 718/1; 715/736
See application file for complete search history.

(56) References Cited

U.S. PATENT DOCUMENTS

| | | | |
|---|---|---|---|
| 7,093,239 B1 * | 8/2006 | van der Made | 717/135 |
| 7,260,820 B1 * | 8/2007 | Waldspurger et al. | 718/1 |
| 2003/0037258 A1 | 2/2003 | Koren | |

\* cited by examiner

*Primary Examiner*—KimYen Vu
*Assistant Examiner*—Baotran N To
(74) *Attorney, Agent, or Firm*—Scully, Scott, Murphy & Presser, P.C.; Lisa M. Yamonaco

(57) ABSTRACT

A computer system having at least one CPU has as its only interface with the Internet and other external sources a virtual machine that contains a browser and/or other communications programs, so that e-mail and other external communications are opened within the virtual machine and stored within a virtual storage. The virtual machine is erased at frequent intervals, taking with it any changes made by virus or other hostile programs.

14 Claims, 2 Drawing Sheets

VIRTUALIZED PROTECTIVE COMMUNICATIONS SYSTEM

TECHNICAL FIELD

The field of the invention is that of computer operating systems, in particular to systems resistant to various unwanted programs.

BACKGROUND OF THE INVENTION

It is well known that various hostile programs such as viruses, trojans and adware are a major concern. It is also well known that protection is needed for users who are browsing the web and viewing web pages that may implement spyware, adware, and various other forms of browser hijacking programs and controls.

Spyware and adware problems have become one of the largest single customer service complaints for suppliers of personal computers and are often the most troubling technical support issue for computer companies, help desks, and service providers today. Adware and spyware may lead to slow performance, the inability to access the Internet, extra icons and unsolicited pop-up ads. These problems can affect the system manufacturer's reputation, increase support costs, and impair the customer experience.

SPAM continues to be a major problem, tying up network bandwidth and storage, but more importantly, rogue email is being used to deliver viruses and trojans to unwitting recipients. As SPAM elimination programs continue to improve, so do the methods and software technology for the mass mailing programs used by spammers.

The category of "hostile files" or, interchangeably, "hostile data" includes viruses, worms, Trojan horses, software installers, other executable programs, spam, pop-up ads, data including text and graphics that induces hostile behavior in an otherwise non-hostile program, While there have been several efforts to limit or outlaw certain types of email, it seems that this problem will have to be dealt with for an extended period of time.

Efforts thus far to block SPAM, viruses and trojans have concentrated on identifying the virus, trojan, or SPAM using keywords, signatures, and various other recognition techniques. SPAM filters require constant updating; often with user input to help the filters discriminate between desired and hostile messages. Virus definitions also require frequent updates. Writers of viruses and trojans have become more sophisticated in their techniques, especially with trojans and ad-ware. Trying to stay ahead of these malevolent programmers requires a great deal of expense and discipline to insure that systems are always operating with the latest filters and virus definitions.

If a virus does succeed in causing damage, the most common approach is to attempt to remove the virus using a commercially available virus removal tool. If removal is successful, the user can then reboot the machine, copy damaged files from a backup file or CD or otherwise repair the damaged software or data. Removing the offending virus or Trojan can be problematic, however, because these programs attempt to thwart their removal by locking themselves in memory or on disk, hiding themselves, or moving around the system. Some variants regenerate themselves the next time the system is rebooted, even if the initial removal was successful. Still other variants disguise themselves as valid files belonging to the operating system or a standard application such as Microsoft Word.

One general problem with the present state of the art is that, if a program gets through the various filters on the input, there is little protection available to limit the damage that it does. In the case of a virus, the errant program could compromise the operation of the system before it is removed. In the case of a Trojan or adware, the errant program can install itself in stealth mode so it does not appear in a list of running programs or otherwise not allow itself to be recognized.

One approach in the art uses a specific piece of software such as a mobile agent. Agents are a technology that is used to encapsulate communicating functions. Communications from external sources are examined on the way in for the presence of Trojans or viruses, and if detected, the offending programs or attachments are removed before allowing the errant program or infected file to enter the system. Agents run as processes on the host OS, or in the case of Java agents, as one or more threads in a Java Virtual Machine (JVM). In turn, the JVM runs as a process. In either case, the programming model of the agent code is dictated by either the Java runtime or by the programming model supported by the underlying OS, and the degree to which agent code can affect other programs or the OS itself is determined by the degree of process isolation implemented in the OS. Typical client operating systems do not implement strong process isolation, leaving them vulnerable to stack-smashing attacks and others. Some client operating systems do not control the consumption of platform resources (disk and network activity, CPU cycles) by processes, leading to the potential for denial-of-service attacks on the platform. Once inside, however, the offending software would be free to infect the system.

U.S. patent application 2003/0037258 by Koren titled Information Security System and Method discusses a secured virtual communication space system for secured communications between a plurality of communication devices. The key element of this invention is a tamper-proof control device which guards a secured virtual space community via a public encryption code. The requirement of a separated control device is, of course, a practical limitation.

The art could benefit from a system that provides protection even if or when the hostile program passes through the various protective filters that scrutinize incoming communications.

SUMMARY OF THE INVENTION

The invention relates to a method and apparatus for a virtualized protective communications system that provides an interface between a computer and the outside world thereby providing an isolated environment in which a user can retrieve, read, compose, and send electronic mail or other types of electronic communications without being concerned about viruses, trojans, adware and other types of hostile programs.

A feature of the invention is a computer system having at least one CPU that has as its only interface with external sources a virtual machine.

A feature of the invention is that e-mail is encapsulated or confined in a virtual environment that is erased and recreated at frequent intervals, taking with it any changes made to the virtual environment when it is erased.

A feature of the invention is that instead of trying to detect ad-ware, viruses and trojans as they are received, these communications flow unencumbered through one or more virtualized operating environments. Instead of blocking, eliminating, or detecting errant programs, the errant software is allowed to pass into the virtual machine unobstructed. When the operation is completed, the content portion of the communication is sanitized, viruses or trojans removed, and the leaned data is then sent to a trusted virtualized receptor that in turn forwards the content to the intended client software application, such as Microsoft Outlook. Content received from the virtual machine is deemed to be safe to read and/or open.

To prevent the case where a file or attachment might make it past the detection software, each file or attachment is opened inside the virtual machine to insure that the errant program or virus is not somehow disguised or hidden within a file, such as a Microsoft Word document. If the detection software detects the presence of a virus, Trojan, or errant software, the infection is removed prior to passing the data to the client application. If the virus or Trojan cannot be removed, the client software receives notification that the invention has detected a virus or Trojan, and deletes the infected file or program.

The original environment where the communications was received is completely torn down and removed, and rebuilt new for each occurrence of the communications. Thus any trojans, spyware, registry changes, etc are completely discarded when the operation has been completed and the main operating environment is not subject to any of these threats.

DETAILED DESCRIPTION

Figure 1:
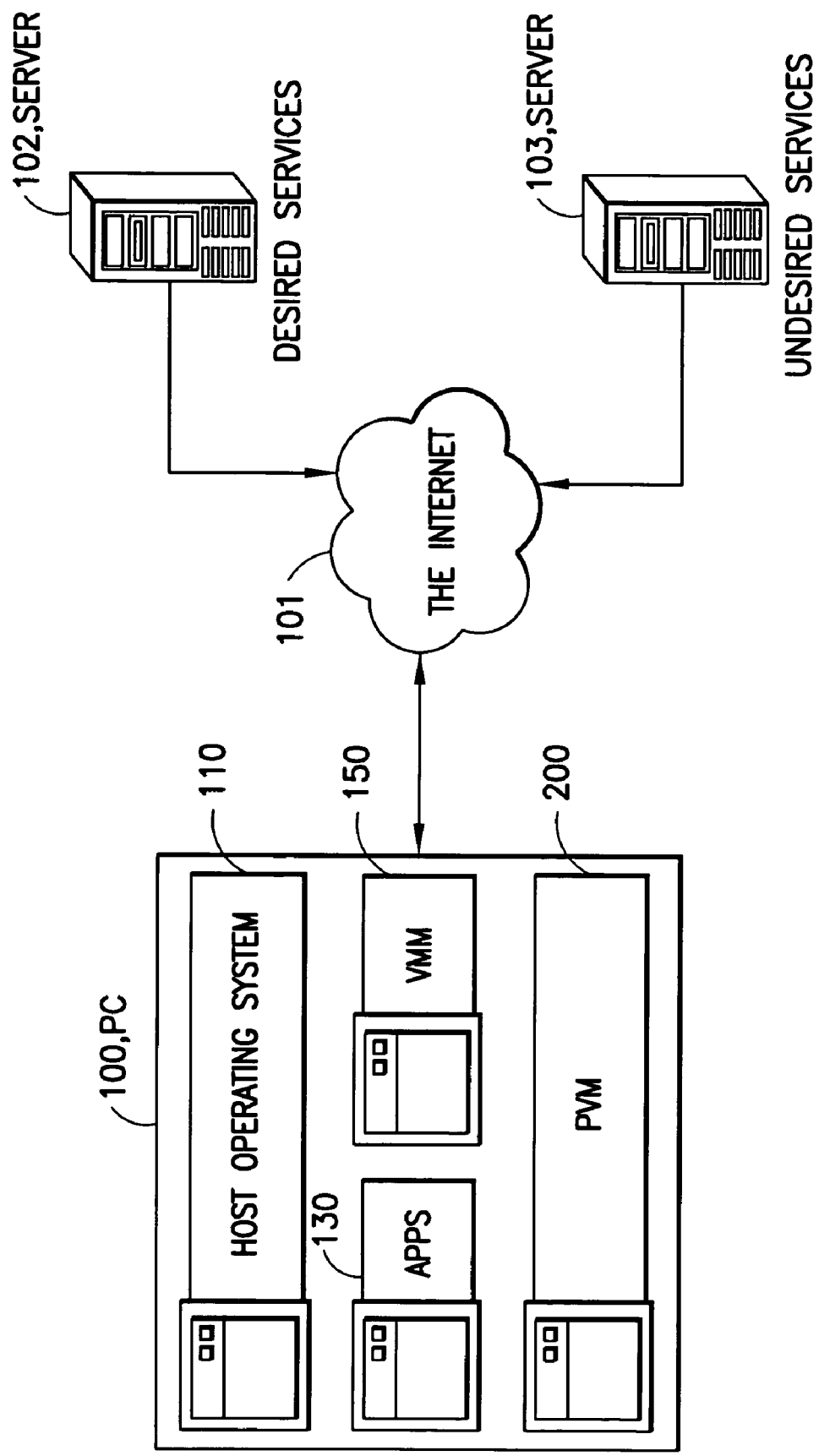
FIG. 1 shows a block diagram of the present invention.

FIG. 1 depicts the overall configuration of a computer system embodying the invention. In the figure is shown a personal computer 100 with a network connection to an intranet 110 or to the Internet 101. Additionally, two server computers are shown, each with network connections to the Internet. One of the two servers (102) provides a set of desired services to the personal computer, those services being of interest to the user of the personal computer. Examples of such services are mail, news, time, the World Wide Web, and the like. The other server (103) provides a set of undesired services to the personal computer, those services being contrary to the interest of the user of the personal computer. Examples of such services include spam, viruses, trojans, and other such.

Within the personal computer, software is configured consisting of a host operating system 110 which supports applications, including the Virtual Machine Monitor (VMM) application 150. The VMM application provides one or more virtual machines. One such virtual machine, the Protective Virtual Machine 200 (PVM), is shown in the figure.

PVM 200 is configured to have direct and exclusive access to the network interface, and thus to the network connection to an intranet or the Internet. The physical network interface that permits connections to an intranet or to the Internet resides in the host computer and is controlled by the host operating system. The host operating system virtualizes the physical network connection, which makes that connection available to one or more virtual machines. Each virtual machine sees the virtualized adapter and interface as the actual hardware, even though it is a software program that emulates the hardware. The output of the physical network connection is routed directly to one or more virtual machines but not to other applications that run outside one of the virtual machines. Any application or program that attempts to access the network can only do so through the PVM, and cannot access the networking hardware directly. This prevents a Trojan or virus from entering the system without be scrutinized by the PVM of the present invention.

Thus all communication between the host operating system and the Internet is mediated by the PVM. For example, when a user clicks on a Web page to display its content, the user is actually requesting the download of the Web page data. The request is sent from the VM to the PVM, and from the PVM to the network. The returned data is received by the physical network card, routed to the PVM, and scrutinized by the present invention. If the content is free of viruses and Trojans, the data is passed to the PVM where it is rendered or displayed.

The PVM is configured with networking software typical of personal computer systems, including a software stack for the TCP and IP protocols. Clients for certain services provided over the Internet reside both as applications using the host OS, and within the PVM. The configuration of clients may be such that all clients for services provided over the Internet are installed in both the host OS and in the PVM, or only some of such clients are installed in the PVM.

In one implementation of the present invention, the PVM passes Internet traffic for clients residing only on the host OS directly to the host OS, while directing Internet traffic for all clients residing in the PVM to those clients. Clients residing on the host will not receive the benefits of this invention because the PVM is bypassed for that class of communication.

Virtual machines are used to encapsulate potentially communicating functions, and provide strong guarantees that the code that runs in them cannot affect the underlying platform. In particular, the file system of a virtual machine is distinct from the file system of the underlying host OS. Virtual machines are independently schedulable entities and thus offer the possibility of strong resource control as well. For these reasons, virtual machines offer a very good first-line-of-defense against inadvertent and malicious attacks carried over the Internet.

Such virtual machines, or VMs, are not unique. VMs have been used since the IBM 360 for the testing of operating systems and software that can not interfere with the normal operation of the system. The VM acts as a sandbox where the program can run as if it were running directly on the system hardware, and if the system crashes, only the system running in the affected VM is affected. The rest of the system is not affected, and in fact, it may have no knowledge that other virtual machines are being run. The main host operating system may itself be running in a virtualized environment. In some systems, multiple VMs may be executing with no knowledge that other VMs are also running.

This invention utilizes the properties and functionality of a virtual machine. This invention relates to a VM running within an overall computer system that places the email program and its environment into its own virtual machine. This virtual machine contains a copy of the operating system environment including storage, processor, devices and memory. The email program and browser run normally, without any change resulting from the fact that they are running in a virtual machine, a replica of the actual system. Every resource that the program requires is virtualized so that they appear to the browser and email programs as being physically present.

When a virus or trojan is passes into the receiving system (and is not detected by any anti-virus software that may be present), the virus or trojan is installed in the virtual machine. If the trojan writes to persistent storage, for example, the write is "completed" and the trojan gets installed. In the case of an email carrying a virus, the virus is presumably detected by the virus program running in the virtual machine and disposed of normally. However, if the virus does get by the protection mechanism and gets installed, it is installed in the virtual machine copy. Similarly, a worm program that uses the resident computer to transmit messages over the internet will perform that function.

Certain Trojans or viruses work by executing a single instance of the offending software and then removing themselves so they will not be detected. In most cases, a virus will be detected immediately by the AntiVirus software running on the host computer or within the PVM. In the event that the offending program is not detected immediately, the effects will be minimal or non-existent because the effect will be on the virtual machine instance of the system, and not no the host system. In the even that the Trojan or virus resides inside a file, the virus or Trojan is removed and deleted by the PVM before the file is passed to the client software that will use it. If the virus cannot be removed, the entire file will be deleted.

The design of virtual machines insures that each virtual machine is completely isolated from another running on the same hardware, so no harm comes to any other program running in another virtual machine or in the host operating system.

In the case of an email application, the email program operating in another virtual machine receives only the safe portion only of the email message as described below. The email application may reside in the host computer or in another virtual machine.

Once the email in the virtual machine has been processed, the virtual machine is destroyed and recreated for each new email message that needs to be processed. Any virus, trojan, or rogue elements attached or associated with an email message are removed prior to passing the email message to the client application. Once completed, the entire PVM may be destroyed and recreated. Any ill effects or damaged that may have been caused by the offending software are destroyed along with the PVM, and a brand new clean PVM is created to handle the next message or task. Thus any harm that might have been caused by malicious software is removed from the system when the environment is recreated.

Considering a specific client, say a client program that receives the Internet time protocol, the client resides in the PVM accesses Internet services for time through the interface of the PVM. Time services may be provided by the server providing desired services, or it may be the case that due to a hacker attack, time services are being provided from the server providing undesired services. The implementation of the client for time services may be such as to be vulnerable to a hacker attack, say by a buffer overflow attack. Were the undesired time service to have access directly to a time client in the host OS, the buffer overflow attack could compromise the host OS, thus compromising the entire software of the personal computer.

In the configuration in which the time service client resides in the PVM, a hacker attack may compromise the PVM but cannot compromise the host OS, because of the isolation property of virtual machines. Methods for detecting the compromise of the PVM are known to practitioners of the software art. These means include, but are not limited to, means for behavioral analysis of the PVM, means for verifying that the critical files of the PVM file system have not been changed, and means for auditing the specific services active in the PVM.

Under normal circumstances, where the PVM has not been compromised, the time client in the PVM communicates through the host OS with the time client of the host OS, so as to provide time information. But under the circumstances of the compromise of the PVM, this communication between time clients is blocked by the virtualized network interface in the PVM, so that the hacker attack on the time client of the PVM cannot propagate through the time client of the host OS to compromise the PC software as a whole.

If the PVM is compromised, it may signal the host OS of that compromise, either actively through a message to the effect that compromise has taken place, or passively by failing to supply a periodic message indicating that the PVM has not been compromised. The signal indicating compromise may be received by a special application with access to the VMM. This application may be external to the VMM, or may be running in another virtual machine supported by the VMM. In either case, an indication that the PVM has been compromised should result in this application directing the VMM to discard the current instance of the PVM and to recreate it, initialize it and run it. This effectively discards the residue of the hacker attack and resumes normal PVM function. Means may be provided to determine the cause of the PVM compromise and cause a new instance of the PVM to be created with additional safeguards against precisely the kind of attack that caused its predecessor's demise.

Virtual machines (VMs) may be erased once an e-mail is read, or the e-mail client is closed, or the browser is closed, or according to other criteria. For example, the VM will preferably be erased when an indication is found that a virus is at work. Additionally, virtual machines may persist for a certain amount of time controlled by the user or by the system. For example, the delay for virtual machine self-destruct may be based on any such factors as machine status (e.g. resources being used), a parameter set by the user (e.g. terminate 10 minutes after I end my access to the communication), or an exponential decay curve. Any of these occurrences may be referred to as a triggering event that triggers the erasure of the VM.

In the event that the computer system requires constant or frequent data from an external source, the erasure of a VM may be followed by the installation of another VM in order to permit the data to continue being received.

The VM may have an assigned importance, which may relate to the value of having the VM persist through time to avoid self-destruction. Thus, the system can automatically cause VM importance to have a value that increases, decreases, or expires in a graduated fashion based on a number of criteria, such as an automatic assessment of the user resources, past use, relevance of the information contained in the VM, and company policy, which may relate to security concerns of company. Using an exponential decay function or other decreasing function, a VM importance may decrease through time. When the importance is below a certain threshold, the VM is considered expired. The rate at which the importance decays can depend dynamically on many ambient factors. The VM holder may be an individual, group, company or other non-human entity. A VM broker may be used to manage the time-dependent nature of individual importance values and aggregate team importance values, to create new VMs on an analysis of individual VMs. Such brokers may charge a fee based on any of the number of users, number of ambient inputs used to compute VM importance, etc. On the other hand, a user may determine that the VM is important and manually request that it persists longer, or the system may increase its resources and permit the VM to persist longer.

The invention described herein provides an automated system for providing indications that the VM has become obsolete, stale, or unstable. A VM persistence agent can use this information to provide a VM that expires after a time interval, with the time interval determined automatically and dynamically based on analysis and policy. For example, the system may determine automatically that the machine CPU or memory is stressed, and then VMs expire more rapidly.

Figure 2:
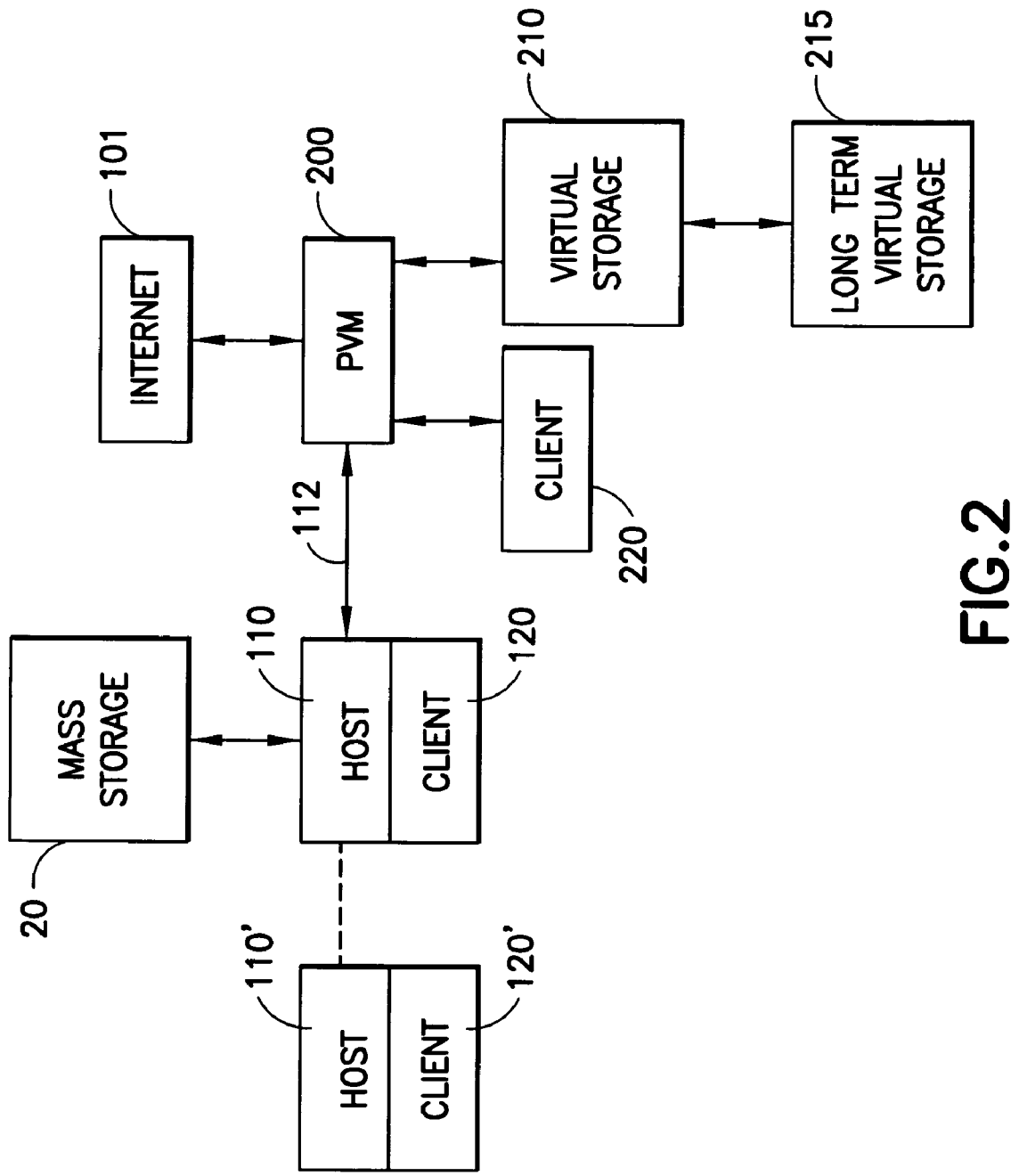
FIG. 2 shows a detail from FIG. 1.

FIG. 2 shows a portion of a network using the invention. On the left of the Figure, boxes 110 and 110' represent a set of CPUs in a network 50 within the organization. Clients 120 and 120' represent applications programs on the CPUs. Box 20 represents mass storage such as hard drives, CD ROMs, etc. On the right, box 200 represents the PVM(s) connected to the network. These PVMs are the only interface between the Internet 101 and the network.

PVM 200 has virtual storage 210 and client software 220 within the virtual environment. When the PVM is erased, storage 210 will also be erased, in order to remove the effects of hostile programs. Long Term Virtual Storage 215 will preferably not be erased as often as storage 210. It is meant for data such as word processing files (or spreadsheets, or other data) that are being worked on by users over a period of days (or longer) and whose erasure would result in loss of work.

Files and data objects are sanitized by a combination of methods depending on the type of infection. If the infection is a virus, the file is examined and repaired by a virus eradication program. If the infection is a file that contains a virus or hidden Trojan, the hidden infection is removed and the file rechecked for a viruses, Trojans, and ad-ware. If the file or data object is a harmful program such as a VB script or similar script, or executable file, the file or data object is removed completely. No file or data object is transferred from the PVM to the client application in a PVM or on the host without first being scrutinized by a virus checker and by one or more spyware and adware detectors.

There may be several PVMs active at a time, depending on the load on the system.

Client software 220 will include browsers and other applications programs that are needed to receive incoming communications, print out e-mail and other text, etc., In the case where the network communications contains an update to be performed on the host, the update is first checked for viruses and spyware or adware. The host will check for a valid signature and key from the update server to verify that the update is real and meant for this particular host system. Once sanitized, the update is passed to the host installer/updater for handling. Any updates or data that is not expected, or that does not produce the proper key or code is immediately deleted. Updates for the PVM are handled in the same manner. PVM updates are also passed to the host installer/updater after being scanned and producing the correct key and authentication. The host installer performs the required updates to the PVM using its own trusted communications link to the PVM. Note this is not the link from the host network interface that is routed from the physical interface to the PVM, but it is a logical link from the PVM to the host. The host then uses a private and unadvertised and unexported secure mechanism for performing the update to the PVM.

In this invention, the incoming communication with which a user is concerned can include e-mail, http (e.g. web page), and software installation (e.g. install wizards). The user may propagate information outside the encapsulation (e. g. the user can do a test on a software installation and decide that the install looks great, and propagate the results, like registry changes, to other virtual machines and to the host system. User can be asked OK to propagate? if company security standards permit this feature.)

The system automatically may tell other systems that a problem has been found with a certain communication. On the other hand, the system can automatically tell other systems that no problem has been found with a certain communication. The system may provide a warning to the current user or friends of the user (e.g. parents, family, group in a company), referred to as notification recipients.

The encapsulation (e.g. VM) may be performed on a machine other than the user machine (as a service and so that the user resources are not greatly impacted). For example, a network within an organization may have one machine designated as the interface that contains one or more PVMs. Communications to and from the internet will flow through these PVMs to the other CPUs on the network.

The encapsulation (e.g. VM) and other status may be represented graphically (e.g. 5 bubbles of different colors on the user computer screen, corresponding to 5 VMs with different problems and features). The status may include the time delay to self-destruction of the VM (if VMs are allowed to persist for a time) and/or the importance value of the VM.

While the invention has been described in terms of a single preferred embodiment, those skilled in the art will recognize that the invention can be practiced in various versions within the spirit and scope of the following claims.

What is claimed is:

1. A computer system comprising at least one CPU, memory, non-volatile storage, an external interface subsystem for receiving electronic data from sources outside the computer system, a host operating system and at least one client application program, in which said external interface subsystem for receiving electronic data is at least one protective virtual machine (PVM); and in which at least one client application program and said host operating system are configured such that said PVM is the only path for data from sources outside the computer system to enter the computer system, all communication between the host operating system and the sources outside the computer system being mediated by the PVM, and the PVM has an assigned importance relating to a value of having the PVM persist through time to avoid self-destruction;

said PVM contains at least one program for receiving electronic data; and said computer system comprises program means for terminating said PVM upon the occurrence of a triggering event.

2. The computer system according to claim 1, in which said host operating system makes interface hardware for receiving data from outside the system available to said at least one PVM.

3. The computer system according to claim 1, in which said triggering event is selected such that said PVM is erased upon one of: the detection of a hostile file within said PVM; and termination of a client application program for receiving external data.

4. The computer system according to claim 1, in which said triggering event is based on a parameter set by a user of the computer system.

5. The computer system according to claim 1, in which said PVM includes program means for reading e-mail and for sending a response thereto.

6. The computer system according to claim 1, in which said computer system includes at least two user machines containing user CPUs connected by a network and at least one interface machine containing an interface CPU that contains said PVM and is configured such that data directed at said at least two user machines is examined by said PVM.

7. The computer system according to claim 1, further comprising means for propagating result of changes to a PVM to other PVMs in the computer system and to the host operating system.

8. The computer system according to claim 1, further comprising means for notifying a set of notification recipients of the status of incoming communications, whether positive or negative.

9. A method of operating a computer system comprising at least one CPU, memory, non-volatile storage, an external interface subsystem for receiving electronic data from sources outside the system, a host operating system and at least one client application program, comprising:

configuring said host operating system such that said external interface subsystem for receiving electronic data is at least one protective virtual machine (PVM);

configuring said host operating system such that said PVM is the only path for data from sources outside the computer system to enter the computer system, all communication between the host operating system and the sources outside the computer system being mediated by the PVM, and the PVM has an assigned importance relating to a value of having the PVM persist through time to avoid self-destruction;

providing at least one client application program for receiving electronic data in said PVM and providing program means for terminating said PVM upon the occurrence of a triggering event in said computer system;

receiving electronic data from a source outside said computer system in a receiving session; and erasing said PVM upon the occurrence of said triggering event.

10. The method according to claim 9, in which said host operating system makes interface hardware for receiving data from outside the system available to said at least one PVM.

11. The method according to claim 9, in which said triggering event is selected such that said PVM is erased upon one of: the detection of a hostile file within said PVM; and termination of a client application program for receiving external data.

12. The method according to claim 9, in which said triggering event is based on parameter set by a user of the computer system.

13. The method according to claim 9, in which said PVM includes program means for reading e-mail and for sending a response thereto.

14. The method according to claim 9, in which said computer system includes at least two user machines containing user CPUs and at least one host machine containing a host CPU that contains said PVM and is configured such that data directed at said user machines is examined by said PVM.

* * * * *